United States Patent
Verdon et al.

(10) Patent No.: US 7,021,041 B2
(45) Date of Patent: Apr. 4, 2006

(54) BRACELET WITH LINKS MADE OF RIGID MATERIAL ON A FLEXIBLE CORE

(75) Inventors: Christian Verdon, Boussens (CH); Michael Bach, Biel (CH)

(73) Assignee: Montres Rado SA, Lengnau (CH)

( * ) Notice: Subject to any disclaimer, the term of this patent is extended or adjusted under 35 U.S.C. 154(b) by 0 days.

(21) Appl. No.: 11/055,677

(22) Filed: Feb. 11, 2005

(65) Prior Publication Data

US 2005/0183412 A1 Aug. 25, 2005

(30) Foreign Application Priority Data

Feb. 20, 2004 (EP) .................................. 04003856

(51) Int. Cl.
*F16G 13/00* (2006.01)
*A44C 5/02* (2006.01)

(52) U.S. Cl. .................. 59/80; 59/82; 59/84; 63/4; 63/7; D11/4

(58) Field of Classification Search .............. 59/80, 59/82, 84; 63/4, 7; D11/4
See application file for complete search history.

(56) References Cited

U.S. PATENT DOCUMENTS

| 1,214,135 | A | * | 1/1917 | Clark | 59/80 |
|---|---|---|---|---|---|
| 1,283,883 | A | * | 11/1918 | Palk | 59/80 |
| 1,357,139 | A | * | 10/1920 | Bayardi | 59/80 |
| 1,570,932 | A | * | 1/1926 | Anderson et al. | 59/80 |
| 1,808,140 | A | * | 6/1931 | Kestenman | 59/80 |
| 4,638,627 | A | * | 1/1987 | Wullsehleger et al. | 59/80 |

FOREIGN PATENT DOCUMENTS

| CH | 365 242 | 12/1962 |
|---|---|---|
| CH | 630 789 A5 | 7/1982 |
| DE | 10 81 260 | 5/1960 |
| EP | 030 705 A1 | 6/1981 |
| FR | 2 625 879 A1 | 7/1989 |

* cited by examiner

*Primary Examiner*—David B. Jones
(74) *Attorney, Agent, or Firm*—Sughrue Mion, PLLC

(57) ABSTRACT

The bracelet (1) is formed of several juxtaposed links (2) made of rigid material and a flexible core (3) onto which the links are threaded. The flexible core (3) is formed over a part of its length of flexible elements (4) removably assembled one after the other. Each flexible element comprises on two opposite sides a first assembling portion (7) and a second assembling portion (6) complementary to the first assembling portion. The elements can be assembled one after the other by fitting the first and second assembling portions together to form a flexible strip. The links (2) are positioned on the flexible core to hold the flexible elements in their assembled position.

12 Claims, 4 Drawing Sheets

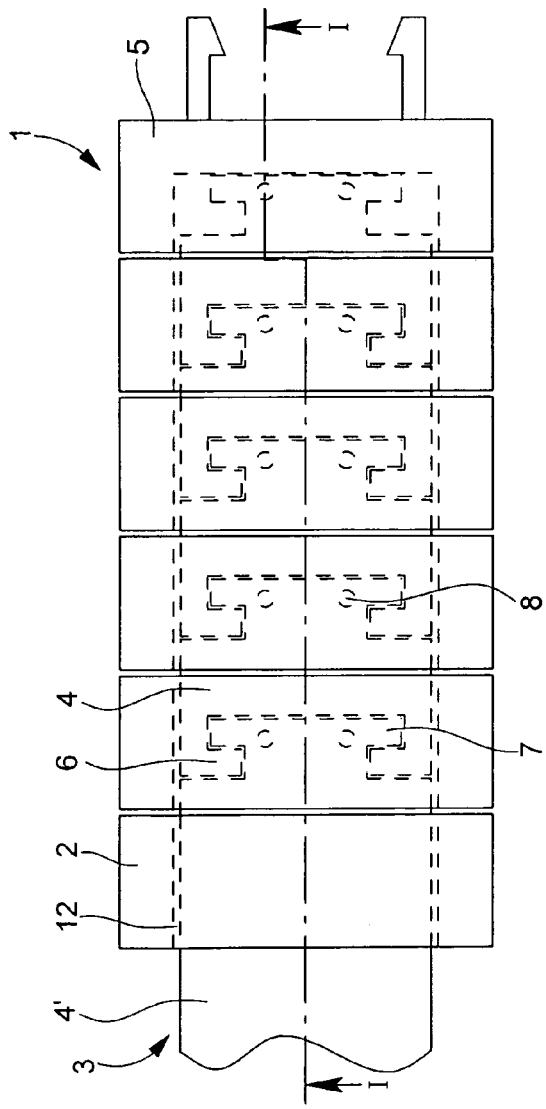
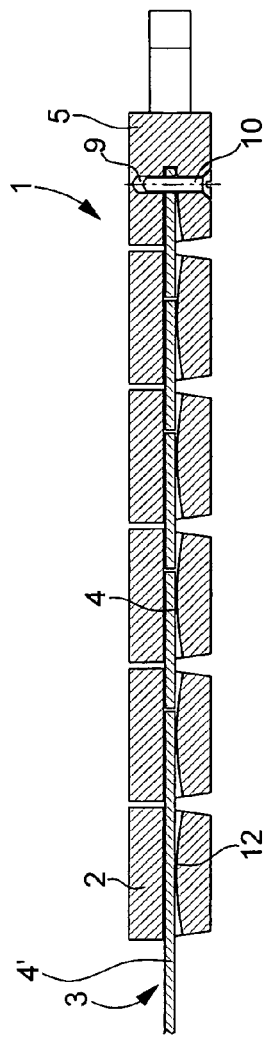
Fig. 1a
Fig. 1b

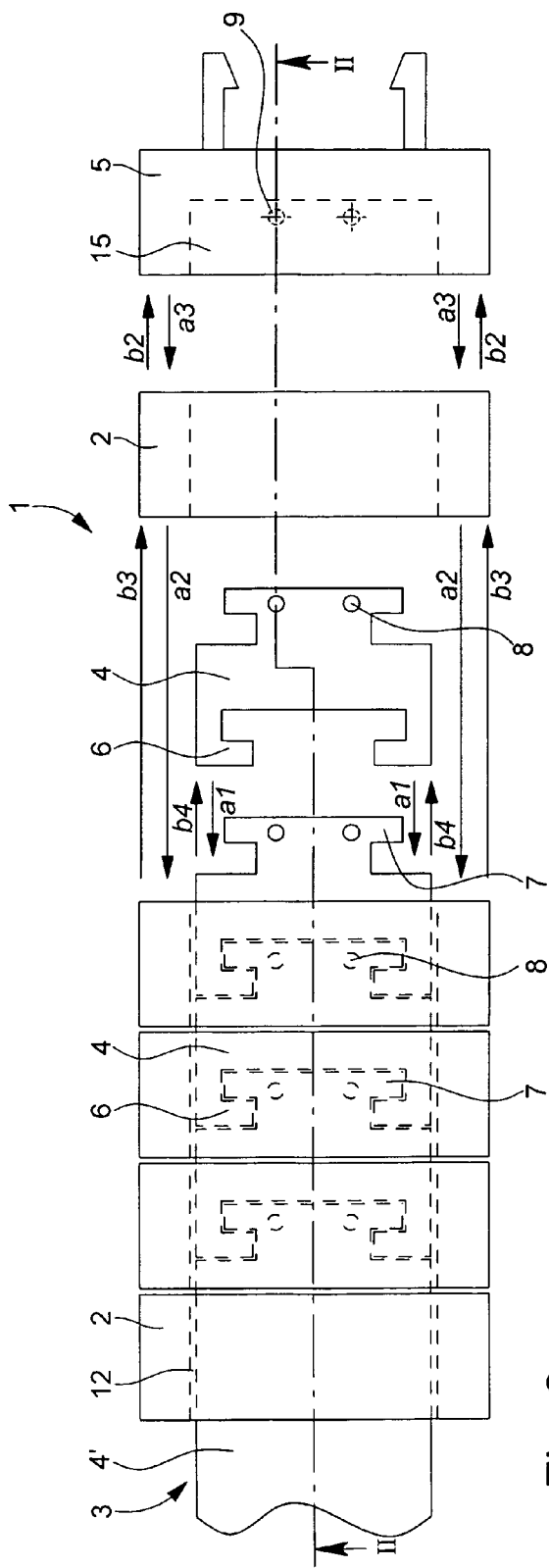
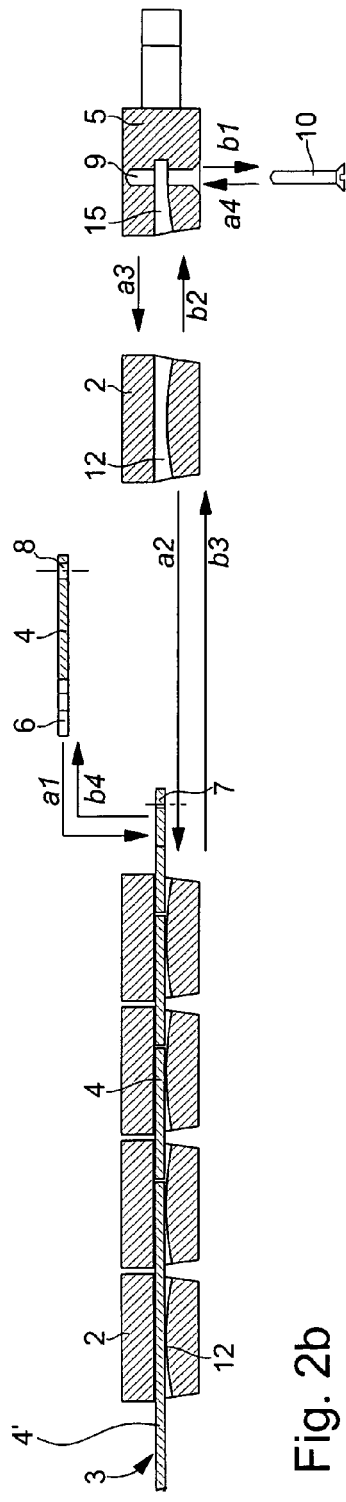
Fig. 2a
Fig. 2b

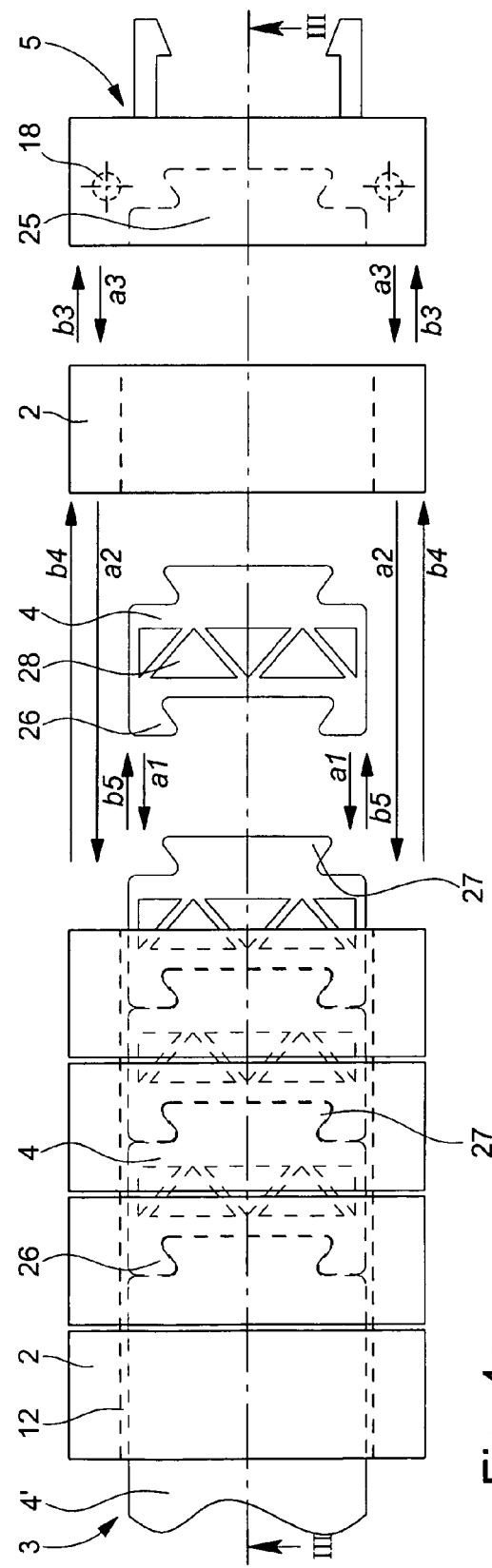
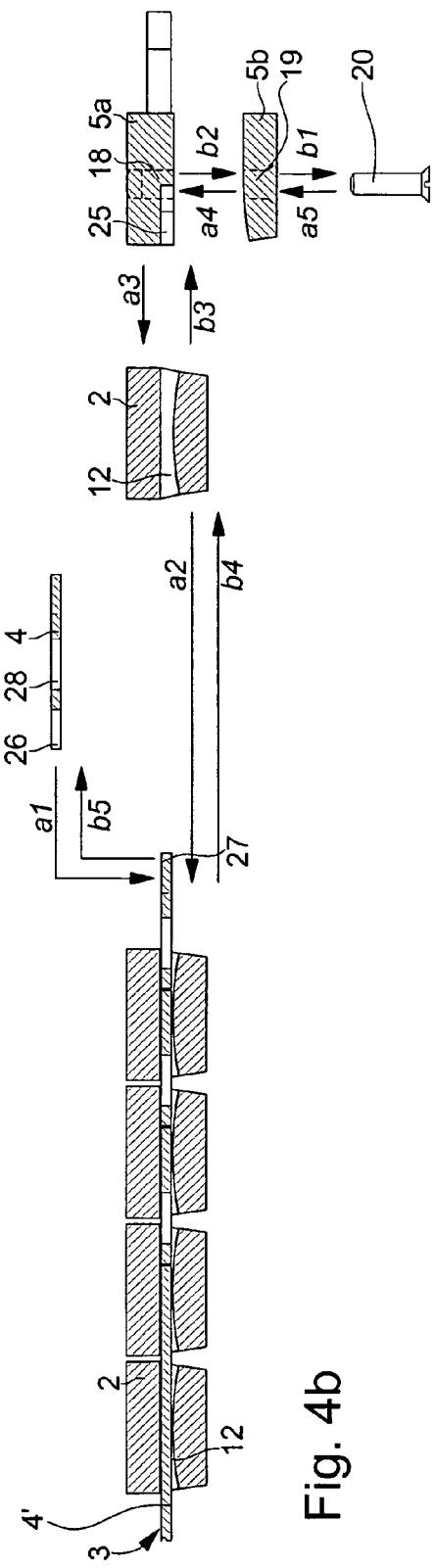
Fig. 4a
Fig. 4b

BRACELET WITH LINKS MADE OF RIGID MATERIAL ON A FLEXIBLE CORE

This application claims priority from European Patent Application No. 04003856.4 filed Feb. 20, 2004, the entire disclosure of which is incorporated herein by reference.

BACKGROUND OF THE INVENTION

The present invention concerns a bracelet with links made of rigid material on a flexible core. The bracelet is formed of several juxtaposed links made of rigid material, which are threaded onto a flexible core, which gives the bracelet all the flexibility necessary for it to be able to bend. The bracelet can be, for example a watchband with one or two branches, or a conventional bracelet with one branch and parts of a clasp each arranged at one of the ends of the bracelet branch.

The links made of rigid material are used as a rigid decorative part, but also to make the bracelet more resistant and more solid. The rigid material used must thus be chosen from a type suited to skin, i.e. anallergic, and highly resistant to abrasion.

Bracelets comprising rigid links mounted on a central core provided with articulation portions have already been disclosed in several documents of the prior art. EP Patent No. 0 030 705, which discloses a hinged bracelet can be cited in this regard. The bracelet is formed of a chain of rigid elements of substantially parallelepiped shape which each have two transverse projecting portions each made on two opposite faces. These projecting portions of each element have a straight L shaped section having a different orientation on each face to allow the elements to grip on one after the other in order to form a chain. The rigid elements are covered with rigid links in the shape of a frame to keep the rigid elements assembled. The bracelet is jointed at the projecting portions of the rigid elements.

One drawback of such a hinged bracelet, disclosed in EP Patent No. 0 030 705, is that it is formed of rigid inner elements. This requires a particular configuration of the elements with their projecting portions in order to allow the bracelet to be jointed. Consequently, the thickness of the bracelet is very large, since the inner elements have to be relatively thick with their projecting portions in order to form a chain of elements and enable the bracelet to be jointed.

CH Patent No. 365 242 discloses a bracelet with jointed elements. This bracelet is formed of a series of rigid plates with rounded opposite edges, which are hooked on one after the other, and rigid rings engaged on the series of hooked plates. These rings keep the plates hooked on while allowing the bracelet to be jointed at the rounded edges of the plates.

As for the preceding document, one drawback of such a bracelet, disclosed in CH Patent No. 365 242, is that the thickness of the rigid inner plates has to be large in order to make a jointed bracelet.

DE Patent No. 1 081 260 discloses a jointed bracelet that is formed of tubular elements, forming links, disposed on a core formed of hook elements assembled one after the other. The length of the bracelet can be adjusted by unhooking some of the hook elements once the links covering them have been removed. However, for the hook elements, which are rigid elements, to be able to be kept hooked on one after the other, a part or pin has to be provided at each hooking portion to complete the space of the inner width of each link that covers them.

Even if the bracelet can have a smaller thickness than that of the documents described hereinbefore, a part has to be added to complete each rigid hook element assembled inside the links covering them in order to hold them. This constitutes a major drawback, since the length of the bracelet cannot be easily adjusted given that several parts have to be placed in combination with the hook elements.

In order to reduce the thickness of the bracelet while ensuring proper flexibility of the bracelet without jointed elements, FR Patent No. 2 625 879 discloses a bracelet having a flexible core. This flexible core is in the form of a strip onto which rings of rigid material are placed.

However, one drawback of such a bracelet with a flexible core is that it is difficult to fit the size of the bracelet to the wrist of the person wearing it. To be able to reduce the size at a desired dimension, it is necessary to go to a specialized shop, since one or several rings have to be removed and the flexible core has to be cut and linked to another end piece.

Another drawback of such a bracelet with a flexible core is that once the flexible core has been cut to fit the size of the bracelet to the person wearing the bracelet, it is no longer possible to enlarge its size for another person wearing the bracelet.

SUMMARY OF THE INVENTION

It is thus an object of the present invention to overcome the drawbacks of the prior art described hereinbefore by providing a bracelet of small thickness which includes links made of rigid material on a flexible core, and wherein the size of the bracelet can easily be adjusted.

The present invention therefore concerns a bracelet cited hereinbefore which is characterized in that the flexible core is formed over a part of its length of flexible elements assembled so that they can be removed one after the other, in that the flexible elements in the direction of the length of the flexible core each include on two opposite sides a first assembling portion and a second assembling portion complementary to the first assembling portion so as to assemble the elements one after the other by fitting the first and second assembling portions together, and in that the links are positioned on the flexible core to keep the flexible elements in their assembled position by covering the fitted portions.

One advantage of the bracelet according to the invention is that it is easy to adjust the size of the bracelet by removing or adding at least one flexible element from the flexible core as well as one or several links. In order to reduce the size of the bracelet starting from one end of the bracelet, an end piece meshed with the last flexible element has first of all to be removed. After this, at least the last link is removed by sliding it over the flexible core from its free end. By removing this last link which was covering the assembled portions of two adjacent flexible elements, the last element can be dismantled from the element to which it was attached. These operations can be carried out in succession or at the same time to remove several links and flexible elements until the size of the bracelet fits the user's wrist.

Advantageously, each flexible element includes on one side a first assembling portion and on an opposite side a second assembling portion of complementary shape to the first assembling portion. In this way, the elements can be assembled one after the other by fitting together their complementary assembling portions. Once the flexible elements of the flexible core have been assembled, the flexible core forms a flexible strip of uniform thickness over most of its length. Of course, only one part of the flexible core can be formed of flexible elements of equal size, since adjusting the size of the bracelet does not occur over the entire length of the bracelet.

Advantageously, the first assembling portion of each flexible element can be T-shaped or dovetailed, whereas the second assembling portion has a complementary T-shaped or dovetailed opening to the first assembling portion.

Advantageously, the flexible core is made of a shape memory material for its super-elastic qualities. This shape memory material can be a metal alloy formed of titanium and nickel, or a composite plastic material. The thickness of the flexible core can be less than 1 mm, for example close to 0.4 mm, but preferably equal to 0.2 mm. The core made with this material can thus withstand significant traction or torsion efforts without breaking while giving the bracelet proper flexibility. Thanks to this super-elastic shape memory material of the flexible core, it is possible to give the core a shape at rest corresponding to the shape of the wrist via a heat treatment. Moreover, with this super-elastic material, elasticity can be more than four times greater than that of a steel spring.

Advantageously, the links of rigid material can be made of ceramic material, cermet or hard metal with a thickness of less than 3 mm, preferably close to 2 mm. In this way, the bracelet can be made with a small thickness while giving it a high level of breakage resistance and security. Moreover, the material of the links is chosen to be anallergic and biocompatible.

Since the various parts making up the bracelet are easy to make and the size of the bracelet can be easily adjusted, costs are reduced.

BRIEF DESCRIPTION OF THE DRAWINGS

The objects, advantages and features of the bracelet with rigid links on a flexible core will appear more clearly in the following description of non-limiting embodiments of the invention in conjunction with the drawings, in which:

FIGS. 1a and 1b show a top view and cross section along the line I—I of FIG. 1a of a first embodiment of a part of the bracelet assembled in accordance with the invention;

FIGS. 2a and 2b show a top view and a cross section along the line II—II of FIG. 2a of the first embodiment of a part of the bracelet according to the invention, which explain how the size of the bracelet is adjusted;

FIGS. 4a and 4b show a top view and a cross section along the line III—III of FIG. 4a of a second embodiment of a part of the bracelet according to the invention, which explain how the size of the bracelet is adjusted.

DETAILED DESCRIPTION OF THE INVENTION

Figure 3A:
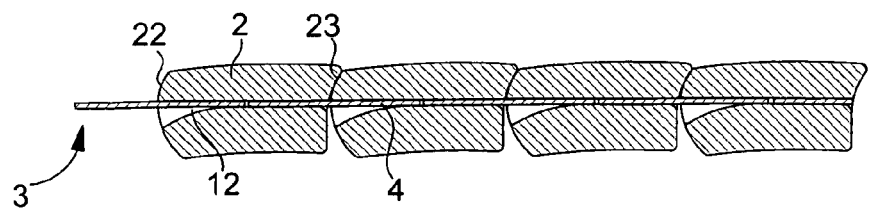
FIGS. 3a to 3c show a longitudinal top view of a part of the bracelet in a rectilinear position, in a slightly curved position and in a greatly curved position with a variant of the links of the bracelet according to the invention.

FIGS. 1a and 1b show, in a simplified manner, a part of one branch of the bracelet 1 in an assembled position. Bracelet 1 includes a flexible core 3 onto which are threaded several links made of rigid material 2, and an end piece 5 secured to one end of the flexible core. End piece 5 can be a part of a clasp, as shown, or a connecting part to a watchcase that is not shown. The other end of the flexible core, not shown, can be either secured to a watchcase in a conventional manner, or secured to another end piece acting as a complementary part to end piece 5.

Flexible core 3 is formed of a first flexible part 4', and several flexible elements 4 which are assembled one after the other from the first flexible part to form a flexible strip. Flexible elements 4 have equal or different dimensions also as a function of links 2 that cover them.

Each flexible element 4 includes, seen in the direction of the length of the bracelet, a first side with a first assembling portion 6, and a second side with a second assembling portion 7 complementary to the first assembling portion. In this way, flexible elements 4 can be assembled in a removable manner one after the others by fitting together their corresponding assembling portions. The assembling portions can be configured so as to hold the parts in contact provisionally by friction when the complementary portions are fitted together.

The first flexible part must, thus, also have at one end an assembling portion from which flexible elements 4 are assembled to form a strip. With this way of assembling the flexible elements, the strip advantageously has a uniform thickness over most of the length of flexible core 3. This thickness of the flexible core can be less than 1 mm, preferably close to 0.2 mm.

The first assembling portion 7 of each flexible element 4 can be T-shaped, whereas the second assembling portion 6 is a T-shaped opening complementary to first assembling portion 7. The first assembling portion 7 of a flexible element 4 can thus be fitted into the second assembling portion 6 of an adjacent flexible element. By repeating these operations with several other elements, a flexible strip forming the flexible core is obtained.

Of course, the assembling portions can be made with other shapes, particularly with one of the assembling portions comprising at least one head and an arm connected the head to the central part of each flexible element. The width of the head is of course larger than the width of the arm in order to hold each assembled element longitudinally. This head can describe a portion of a circle of larger diameter than the width of the arm connecting it to the central part of each element. The other assembling portion must thus be a complementary circular opening in the flexible element.

The material used to make the flexible core can be an elastic material, such as a metallic or super-elastic glass, such as a shape memory material. This shape memory material can be a metal alloy formed of titanium and nickel, or a composite plastic material. This material must be anallergic and biocompatible while providing the bracelet with the flexibility necessary for it to be able to bend easily. It is thus easy to manufacture several flexible elements particularly by stamping several plates or sheets of such a material.

In order to keep flexible elements 4 in an assembled position, they are covered by links 2 made of a rigid material shown with a substantially parallelepipedic general shape. These links 2 form rings with a longitudinal opening 12 of sufficient dimension to allow the links to be threaded and slid over the flexible core. The longitudinal opening 12 has a slightly curved surface to allow a vertical travel of the flexible elements when the bracelet is bend. Moreover, the lower part of each link has a truncated pyramidal shape so to be able to bend the bracelet by bending the flexible core.

The links are advantageously made of ceramic material, cermet, hard metals, or wood with a thickness of less than 3 mm, preferably equal to 2 mm.

Links 2 can be threaded onto the flexible core in succession from a first end of the core to the other end of the flexible core once the flexible elements have been assembled, or gradually as the elements are successively assembled. The width of the longitudinal opening 12 of each link is slightly greater than the maximum width of each flexible element, and the height thereof is less than twice the thickness of each flexible element 4. Preferably, the minimum height of the opening is slightly greater than the thickness of each flexible element 4. In this way, the links can easily slide over the flexible core.

Once links 2 have all been mounted on flexible core 3 between each end of flexible core 3, they are positioned such that each zone of the assembling portions of the assembled elements is entirely covered by one of the links. Consequently, this enables all of the flexible elements of the flexible core to be kept in an assembled position. Links 2 can be positioned on flexible core 3 by end piece 5, once said end piece 5 has been secured to the last assembling portion of the last element 4 or the first flexible part 4'.

In order to secure end piece 5 in accordance with this first embodiment of FIGS. 1a and 1b, the first assembling portion 7 of each element 4 and of the first part 4' include one or two openings 8. End piece 5 comprises one or two blind holes 9 disposed in a direction perpendicular to the length of the bracelet. One or two stems 10 are mounted in each blind hole 9 passing through the opening or openings 8 of the last flexible element 4 or the first flexible part 4'.

Blind holes 9 can be threaded, and the two stems 10 can be screws which are each screwed into one of holes 9. Of course, the securing screws of the end piece are located on the side of the bracelet that comes into contact with the wrist of the person wearing the bracelet in order to conceal them.

FIGS. 2a and 2b relating to the first embodiment of the bracelet explain how the size of bracelet 1 is adjusted. It should be noted that all of the same elements of the bracelet described hereinafter bear the same reference signs as those described with reference to FIGS. 1a and 1b. Consequently, the description of all of these elements will not be repeated.

To simplify the explanation relating to the adjustment of the size of the bracelet, it is referred only to the addition or removal of one flexible element 4 and one corresponding link 2. Of course by equivalence, the addition or the removal of several elements and links can be made in the same manner.

In order to enlarge the size of the bracelet, end piece 5 of the first assembling portion 7 of the last flexible element 4 is first of all removed. Then, at step a1, the second assembling portion 6 of an additional flexible element 4 is fitted into the first assembling portion 7 of the last element of flexible core 3. After having assembled this new flexible element 4, a new link 2 is threaded onto the core until it comes into contact with the last preceding link of bracelet 1 at step a2.

Once the new link 2 has been positioned on the flexible core, the first assembling portion 7 of the additional element remains exposed in order for the end piece to be threaded on at step a3. As soon as end piece 5 is placed at the end of the flexible core on the first assembling portion of additional element 4, securing screws 10 are screwed into threaded holes 9 passing through the two openings 8 at step a4. Thus, the size of the bracelet has been adjusted with one additional element and link.

In order to reduce the size of the bracelet, securing screws 10 are first of all unscrewed and removed from blind holes 9 at step b1, then end piece 5 is removed from the flexible core at step b2. After that, the last link 2 has to be slid in order to remove it from the flexible core at step b3. Finally, the last flexible element 4 can be removed by uncoupling its second assembling portion 6 from the first assembling portion 7 of the adjacent element at step b4. Once one element and one link have been removed from the bracelet, end piece 5 is secured to the first assembling portion of the last element of the flexible core.

It will be understood from the various steps explained hereinbefore that it is very easy to adjust the size of the bracelet to the wrist of any person wearing said bracelet, without it being necessary to go to a specialised shop for such purpose.

Figure 3B:
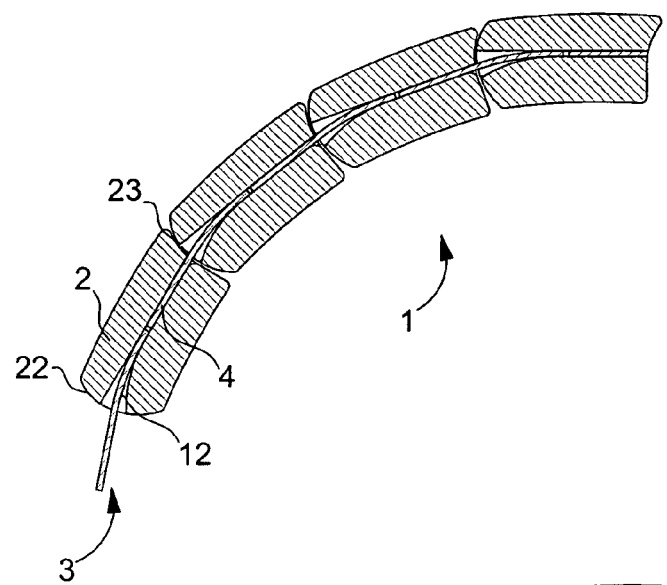
Figure 3C:
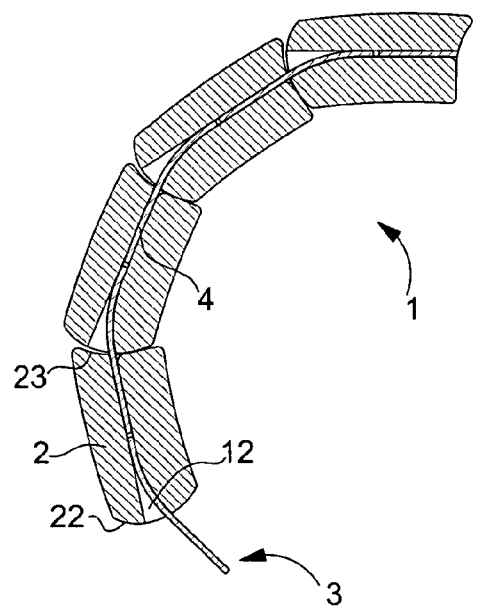

In order to illustrate the flexibility of the bracelet formed of the flexible core and several links made of rigid material, reference can be made to FIGS. 3a to 3c which show a part of the bracelet in a rectilinear position, in a slightly bent position and in a very bent position, which can be the maximum bent position of the bracelet. As previously, the same elements of the bracelet described hereinafter bear the same reference signs and will not be explained in detail.

The shape of the links shown in these FIGS. 3a to 3c is slightly different from that shown in FIGS. 1a and 1b particularly as regards their upper part. It will be noted that each link has a first rounded convex portion 22 in the upper part on a first face and a second rounded concave portion 23 on a second opposite face. Thus, by juxtaposing links 2 on flexible core 3, the first convex portion 22 of one link comes inside the second concave portion of an adjacent link.

By bending bracelet 1 as shown in FIGS. 3b and 3c, a flexion of flexible elements 4 of the flexible core is observed, which can move vertically into longitudinal opening 12. Because of this flexible core 3 and without using articulation pins, it is possible to bend said bracelet easily, particularly to a maximum position as shown for example in FIG. 3c.

FIGS. 4a and 4b relating to a second embodiment of the bracelet explain how the size of bracelet 1 is adjusted. It is to be noted that all of the same elements of the bracelet described hereinafter bear identical reference signs to those described with reference to FIGS. 1a and 1b, with the exception of the assembling portions which differ from those previously described. Consequently, the description of all of these elements that have already been described, will not be repeated.

In order to simplify the explanation relating to the adjustment of the size of the bracelet, reference is only made to the addition or removal of one flexible element 4 and one corresponding link 2 as for the first embodiment of FIGS. 2a and 2b. Of course, by equivalence, several elements and links can be added or removed in the same manner.

The first assembling portion 27 is of trapezoidal shape or dovetailed seen from above and the second assembling portion 26 is an opening of trapezoidal shape or dovetailed complementary to the first portion. Openings 28 are also made in a central part of certain elements in order to be able to adjust the return force of the bracelet in flexion. However, one could also envisage reducing the thickness of each flexible element in places, which may be disadvantageous since the general thickness of the flexible core is already greatly reduced.

In this second embodiment, it should be noted that end piece 5 is formed of a first part 5a and a second part 5b. The second part 5b is secured to the first part 5a using two screws 20 passing into holes 19 of second part 5b and each screwed into a corresponding threading 18 of first part 5a.

Once second part 5b is secured to first part 5a, end piece 5 includes a recess 25 of complementary shape to the first assembling portion 27 of a flexible element. Consequently, it is no longer necessary to provide securing openings in each element and in the first flexible part 4' of the flexible core, since the first assembling portion 27 is housed in recess 25 of the end piece.

In order to enlarge the size of the bracelet, end piece 5 is first of all removed from first assembling portion 27 of the last flexible element 4. After this at step a1, the second assembling portion 26 of an additional flexible element 4 is fitted into the first assembling portion 27 of the last element of flexible core 3. After having assembled this new flexible element 4, a new link 2 is threaded onto the core until it comes into contact with the last preceding link of bracelet 1 at step a2.

Once the new link 2 has been positioned on flexible core 3, the first assembling portion 27 of the additional element remains exposed in order to be able to house it in recess 25 of the first part 5a of the end piece 5 at step a3. As soon as the first part 5a of end piece 5 is placed at the end of the flexible core on the first assembling portion of additional element 4, second part 5b is applied against first part 5a at step a4. Finally, the securing screws 20 are screwed into threaded holes 18 at step a5. Thus, the size of the bracelet has been adjusted with one additional element and link.

In order to reduce the size of the bracelet, securing screws 20 are first of all unscrewed and removed from the threaded blind holes at step b1, then second part 5b of end piece 5 is removed at step b2. After that, the first part 5a of the end piece is removed from the first assembling portion of the last element 4 at step b3. The last link 2 is removed by being slid over the flexible core at step b4. Finally, the last flexible element 4 can be removed by uncoupling its second assembling portion 26 from first assembling portion 27 of the adjacent element at step b5. Once one element and one link have been removed from the bracelet, end piece 5 is secured to the first assembling portion of the last element of the flexible core.

It should be noted that end piece 5 may very well have first part 5a hinged using a hinge that is not shown to second part 5b, and other means of securing second part 5b to first part 5a. This end piece can also be formed of a clamp mechanism.

From the description that has just been given, those skilled in the art can devise multiple variants of the bracelet without departing from the scope of the invention defined by the claims. Each link may be C-shaped with the ends of the C bent so that the links can slide over the flexible core and keep the elements assembled. Perforated parts can be provided on the lateral sides of the flexible elements in order to increase the transverse flexibility of the bracelet. The end piece can be configured to be secured to a second assembling portion of an element or of the first part of the flexible core rather than to a first assembling portion as described hereinbefore. Finally, stop members may be provided in the opening of each link and on the sides of the flexible elements, in order to position each link abutting against a stop member of the assembled elements to be concealed.

What is claimed is:

1. A bracelet formed of several juxtaposed links made of rigid material and a flexible core onto which the links are threaded, wherein the flexible core is formed over one part of its length of flexible elements removably assembled one after the other, wherein the flexible elements in the direction of the length of the flexible core each include on two opposite sides a first assembling portion and a second assembling portion complementary to the first assembling portion so as to assemble the elements one after the other by fitting together the first and second assembling portions, wherein the links are positioned on the flexible core to hold the flexible elements in their assembled position by covering the fitted together portions, and the flexible core in the shape of a strip is formed of an elastic or super-elastic material, such as a shape memory material.

2. The bracelet according to claim 1, wherein the flexible core with the elements assembled one after the other form a flexible strip of uniform thickness over most of the length of the core.

3. The bracelet according to claim 2, wherein one of the assembling portions of a flexible element is T-shaped or of trapezoidal shape or dovetailed so as to be able to be fitted into one of the complementary assembling portions of another adjacent flexible element.

4. The bracelet according to claim 1, wherein the links made of rigid material are of tubular shape with a longitudinal opening of substantially equivalent width to the width of the flexible elements and whose height is less than double the thickness of the flexible elements, and wherein the links are positioned on the flexible core so that the fitted together portions of two adjacent flexible elements are entirely covered by one of the links to hold the elements in an assembled position.

5. The bracelet according to claim 1, wherein the flexible core in the shape of a strip has a width of less than 1 mm, preferably close to 0.2 mm.

6. The bracelet according to claim 5, wherein the shape memory material is a metal alloy formed of titanium and nickel, or a composite plastic material.

7. The bracelet according to claim 5, wherein the elastic material is a metallic glass material.

8. The bracelet according to claim 1, wherein the links are made of ceramic material, cermet or hard metals, and wherein the thickness of the links is less than 3 mm, preferably close to 2 mm.

9. The bracelet according to claim 1, wherein, through one of the assembling portions, the flexible elements comprise at least one opening to allow, through the opening of a last flexible element at one end of the core, the passage of a securing stem of an end piece corresponding to a last link, said end piece, secured to the last flexible element, positioning the links on the flexible core.

10. The bracelet according to claim 1, wherein one end piece, corresponding to a last link of one end of the bracelet, is secured to a free one of the assembling portions of a last flexible element, the one free assembling portion being held in a recess of complementary shape of the end piece.

11. The bracelet according to claim 1, wherein said elastic or super-elastic material is a shape memory material, and said flexible core has a width between 0.2 mm and 1 mm.

12. The bracelet according to claim 8, wherein said thickness of the links is between 2 mm and 3 mm.

* * * * *